J. C. DAVIDSON.
CONFECTION AND METHOD OF MAKING SAME.
APPLICATION FILED MAR. 27, 1911.
1,076,751. Patented Oct. 28, 1913.
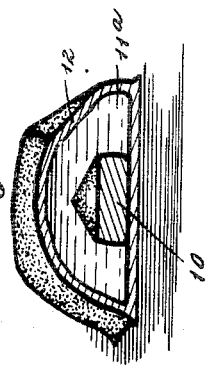
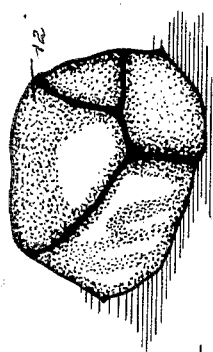
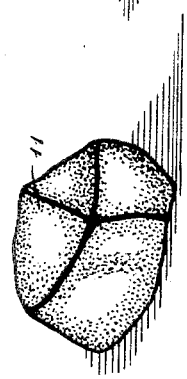
Witnesses.
W. A. Loftus.
A. H. Hogue
Inventor,
James C. Davidson,
by J. Ralph Orwig Atty.

UNITED STATES PATENT OFFICE.

JAMES C. DAVIDSON, OF DES MOINES, IOWA.

CONFECTION AND METHOD OF MAKING SAME.

1,076,751. Specification of Letters Patent. Patented Oct. 28, 1913.

Application filed March 27, 1911. Serial No. 617,096.

*To all whom it may concern:*

Be it known that I, JAMES C. DAVIDSON, a citizen of the United States, residing at Des Moines, in the county of Polk and State of Iowa, have invented a certain new and useful Confection and Method of Making Same, of which the following is a specification.

The object of my invention is to provide a confection consisting of a portion of fruit such as pineapple contained in a liquid syrup for preserving the fruit and for preventing it from drying out, and to inclose the liquid syrup and fruit in a chocolate coating to retain the liquid.

A further object is to provide an improved method of making a confection of this class by which the fruit may first be covered and inclosed in a cream made of sugar of sufficient solidity to be readily and easily handled and to which an ordinary chocolate coating may be applied in the ordinary manner and then after the chocolate coating has been applied and hardened the cream surrounding the fruit will be absorbed and liquefied by the fruit acid and moisture to thereby provide a finished product consisting of a portion of fruit surrounded in a liquid syrup.

My invention consists in the completed confection as an article of manufacture and also in the method of making same, whereby the objects contemplated are attained, as hereinafter more fully set forth, pointed out in my claims and illustrated in the accompanying drawings, in which:

Figure 1 shows a perspective view of a piece of fruit such as pineapple. Fig. 2 shows a similar view of the fruit embedded in a sugar cream. Fig. 3 shows a perspective view of the complete confection embodying my invention, and Fig. 4 shows a sectional perspective view of same.

Referring to the accompanying drawings, I have used the reference numeral 10 to indicate a piece of fruit such as pineapple. The fruit for my improved confection is prepared by first cooking it which is preferably done in a syrup formed of sugar and water. It is however not essential that the fruit be cooked in a sweetened syrup. I then prepare a cream made of sugar and water cooked in the ordinary way now commonly employed by confectioners until it is of sufficient solidity to be readily and easily molded around the fruit, although it is desirable to have the cream in a plastic state so that it may be readily and easily worked and so that it retains a certain amount of moisture. It is well known among those skilled in the art of confection-making that so-called sugar creams for confectionery may be made to any desired degree of solidity by varying the amount of heat applied to it in cooking. When a relatively great amount of heat is applied in cooking the material will be relatively hard when cooled. I therefore discontinue the cooking of the sugar cream when it has been sufficiently cooked so that after it is cooled it will remain in a plastic state so that it may be readily applied to inclose the fruit and so that it has just enough solidity to retain its shape while the chocolate coating is being applied. The sugar cream coating is indicated on the drawings by the numeral 11 in Fig. 2. After the sugar cream has thus been applied to the fruit it is dipped in a solution of chocolate coating 12.

The material comprising the chocolate coating and the method of making and applying it is the same as is now commonly employed by confectioners for making chocolate coated confectionery and of itself forms no part of my invention. Therefore a detailed description of the ingredients and the method of making the chocolate coating is deemed unnecessary herein. After the chocolate coating has been applied in this manner, I have found that within a period of about twelve hours the acid and juices from the fruit will partially dissolve the sugar cream and that within a period of several days the sugar cream will be wholly dissolved and reduced to a liquid syrup highly flavored by the fruit juices and acids. This liquid performs the double function of acting as a preserver of the fruit and preventing the fruit from drying and it also completely fills the interior of the chocolate coating and prevents the same from collapsing or cracking. The fruit preferably employed is pineapple as I have discovered that the juices from a piece of pineapple, after being cooked, combine with the sugar cream in such a manner as to dissolve the sugar cream and to highly flavor the syrup thus formed. I do not intend however to be understood as limiting the scope of this invention with the employment of pineapple as certain other fruits may be successfully used in this method provided the juices thereof have a sufficient amount of acidity to dissolve the sugar cream and highly flavor the syrup thus produced.

One of the reasons for applying the chocolate coating to the exterior of the sugar cream is to prevent evaporation of the moisture in the sugar cream as I have found that unless the chocolate coating is applied within a short time after the sugar cream is placed on the fruit the outer surface of the sugar cream will become dried and hardened to such an extent that it will not be absorbed by the fruit juices.

My improved method of producing the confection embodying my invention consists in first providing a portion of fruit of suitable size containing fruit juices having a sufficient amount of acid therein to dissolve sugar cream; then preparing a sugar cream in the ordinary manner of such consistency that it may be readily and easily molded around the fruit and will retain its shape so that it may be easily handled; then chocolate coating the sugar cream in the ordinary manner, and then storing the confection for a period of time sufficient to permit the fruit juices to dissolve the sugar cream and to form a syrup.

In the practice of my improved method, it is desirable that within a short time after the sugar cream is applied to the fruit and before it commences to harden on account of exposure to the air that the chocolate coating be applied for the reason that the chocolate coating prevents the evaporation of the moisture in the sugar cream so that it will retain its moist and plastic condition until the fruit juices and acids have thoroughly and completely dissolved the sugar cream and reduced it to a thick syrup. It is essential in the practising of my improved method that the materials forming the chocolate coating will not be affected or dissolved by the fruit juices. However the chocolate coating now in common use by confectioners has this property.

It is desirable in the practising of my improved method to so proportion the amount of sugar cream relative to the amount of acid contained in the fruit that the fruit acid will dissolve all of the sugar cream and form a thick syrup. As an illustration, I have found that when pineapple is the fruit employed, the amount of sugar cream for each piece of confectionery is preferably about three times the amount in bulk of the portion of pineapple.

I claim as my invention:

1. An improved article of manufacture, comprising a portion of fruit, a syrup surrounding the same, and a chocolate coating to form a container for the syrup.

2. An improved article of manufacture, comprising a portion of fruit previously cooked in a thin syrup, a comparatively thick syrup in a liquid form surrounding the fruit, and a chocolate coating forming a container for the syrup.

3. An article of manufacture, comprising a portion of fruit previously cooked, a syrup surrounding the portion of fruit composed of sugar cream dissolved by the fruit juices and acids, and a coating forming a container for the syrup and made of a material that will not be dissolved by fruit juices or acids.

4. The herein described method of producing confectionery which comprises first, the providing of a portion of fruit containing fruit juices having an acid element, then preparing a sugar cream and completely inclosing the fruit therein, then forming a chocolate coating over the sugar cream to retain it in moist condition and to permit the fruit juices to dissolve the sugar cream and to form a syrup flavored by the fruit juices.

5. The herein described method of making confectionery which consists in first cooking a portion of pineapple in a thin syrup, then forming a sugar cream in plastic condition and completely embedding the fruit therein, then applying a chocolate coating to the sugar cream and then permitting the fruit juices to completely dissolve the sugar cream to form a syrup flavored by the fruit juices.

6. A confection consisting of a chocolate casing containing pineapple surrounded by syrup.

Des Moines, Iowa, March 24, 1911.

JAMES C. DAVIDSON.

Witnesses:
 MARY WALLACE,
 N. A. GRAHAM.